A. E. METZ.
MILLING MACHINE.
APPLICATION FILED MAR. 12, 1917.

1,269,727.

Patented June 18, 1918.
2 SHEETS—SHEET 1.

Witness
James F. Crown
S. P. Hollingsworth

Inventor
Alexander E. Metz,
By Richard B. Owen,
Attorney

A. E. METZ.
MILLING MACHINE.
APPLICATION FILED MAR. 12, 1917.

1,269,727.

Patented June 18, 1918.
2 SHEETS—SHEET 2.

Witness
James F. Crown
J. P. Hollingsworth

Inventor
Alexander E. Metz,
By Richard B. Owen,
Attorney

UNITED STATES PATENT OFFICE.

ALEXANDER E. METZ, OF NEW YORK, N. Y.

MILLING-MACHINE.

1,269,727.		Specification of Letters Patent.		Patented June 18, 1918.

Application filed March 12, 1917. Serial No. 154,348.

*To all whom it may concern:*

Be it known that I, ALEXANDER E. METZ, a citizen of the United States, residing at New York, in the county of New York and State of New York, have invented certain new and useful Improvements in Milling-Machines, of which the following is a specification.

This invention relates to an improvement in milling machines, and has for its object the provision of a machine of this class with means whereby vertical and horizontal milling may be performed on the same machine by mounting upon the ordinary base of a milling machine a head adapted to revolve about a vertical axis, upon which head is carried at one side a horizontal tool carrying spindle and at the opposite side a vertically disposed tool carrying spindle, the two spindles being driven by a common shaft from the gearing in the base of the milling machine, a clutch mechanism being provided for engaging either of said tool carrying spindles with the common driving shaft.

With the above as the principal object in view the invention consists of the novel construction, combination, and arrangement of parts hereinafter described, pointed out in the appended claim, and illustrated in the accompanying drawings, in which—

Figure 1:
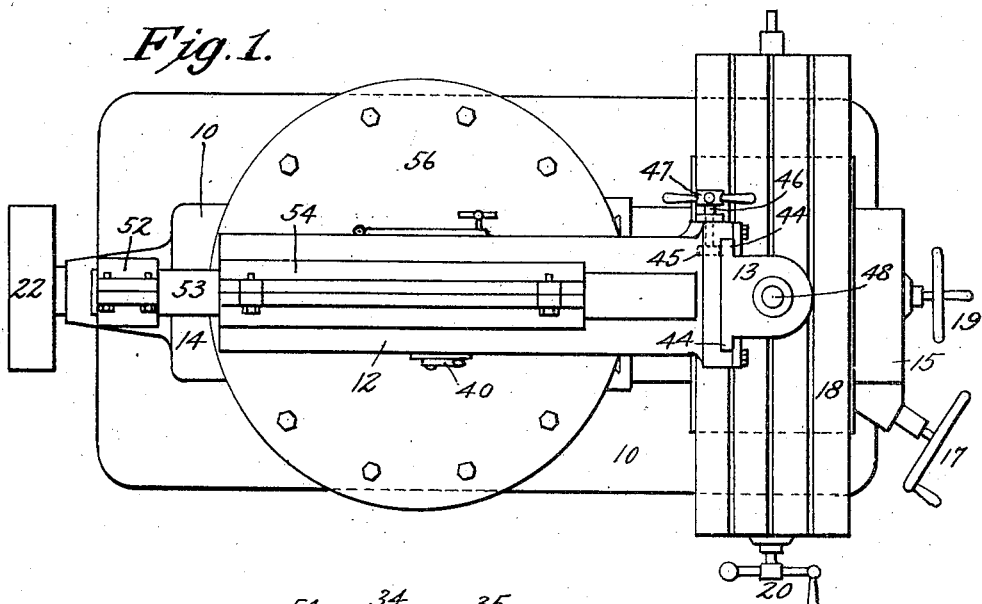
Figure 2:
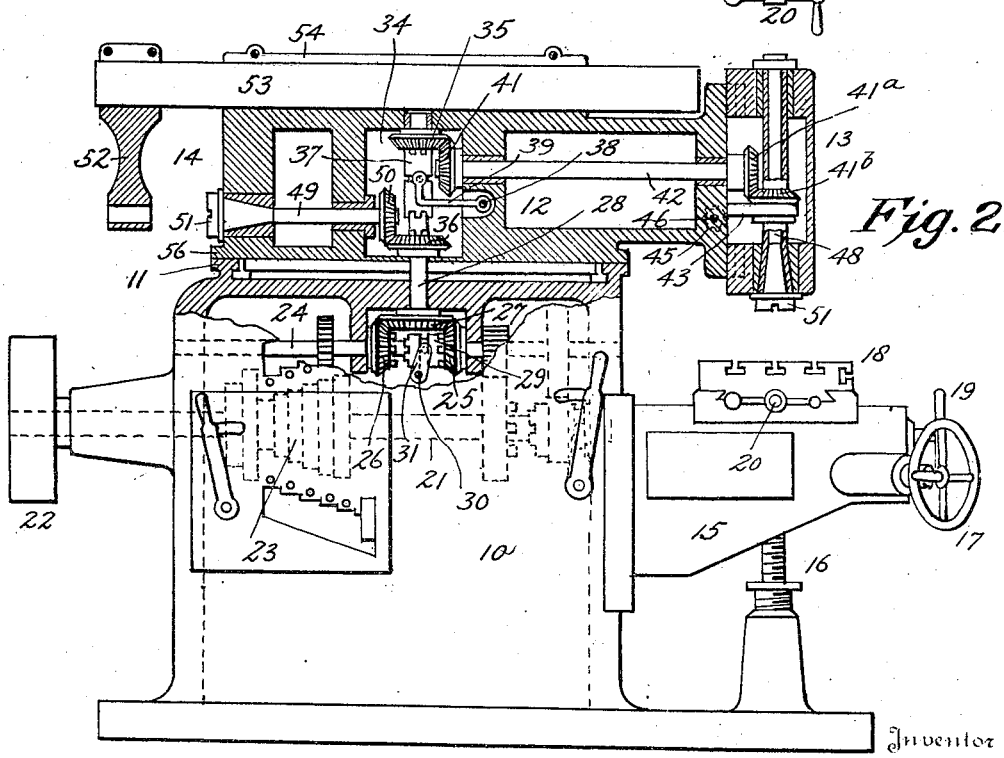
Figure 3:
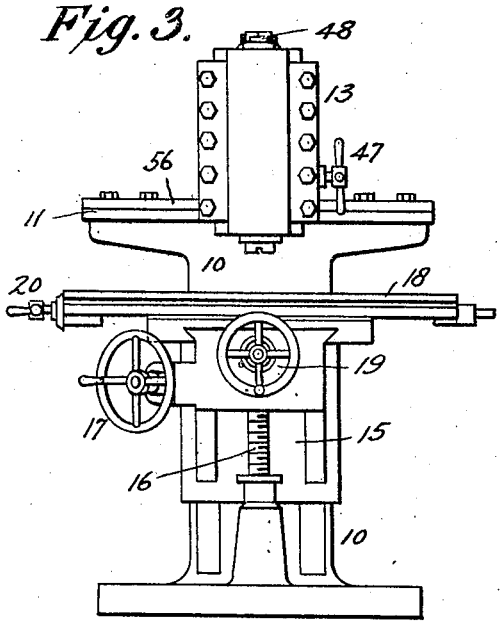
Figure 4:
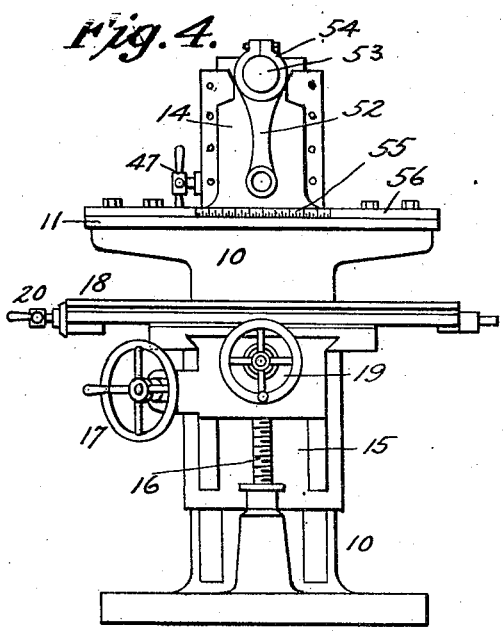
Figure 5:
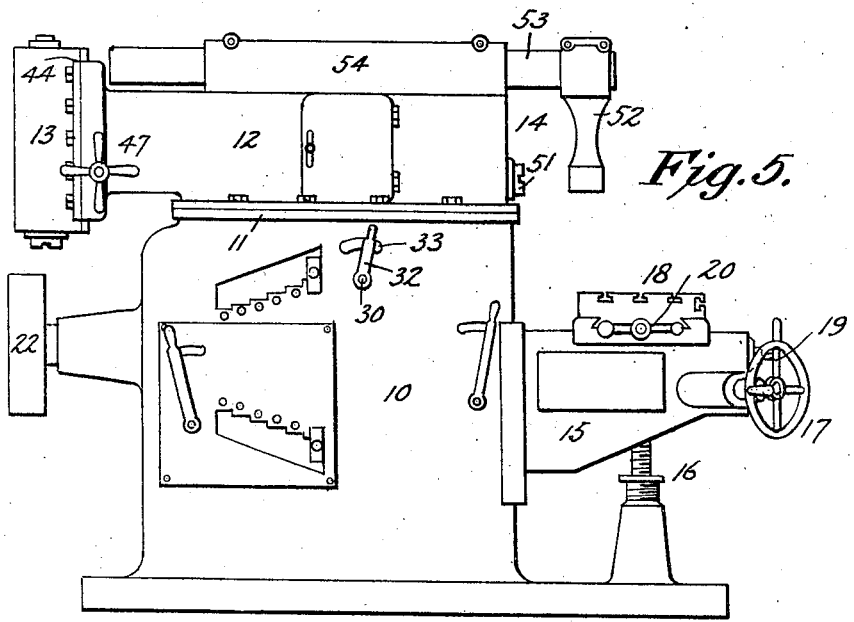

Figure 1 is a top plan view of the improved milling machine,

Fig. 2 is a side elevation from the working side of the machine, the upper portion of which is shown in section, Fig. 3 is a front elevation of the machine as set for vertical milling, Fig. 4 is a similar view with the head reversed to bring the horizontal milling tool in position over the work table, and Fig. 5 is an elevation of the machine from the same side as in Fig. 2 with the head in reverse position from that in said figure.

In the drawings, 10 indicates the base of the milling machine of well-known construction supported upon the floor and projecting upwardly to a suitable height where it is finished with a flat top 11 forming a turn-table for a horizontally rotatable head 12, which in turn supports at one side a vertical tool head 13 and at its opposite side a horizontal tool head 14.

At one side, which, for convenience, may be called the front, is mounted a knee 15 movable vertically in guides on the base 10 by means of a double screw 16 of well-known construction turned by a hand wheel 17. Carried by the knee is the ordinary work table 18 movable to and from the base 10 by a hand screw 19 and at right angles thereto by a hand screw 20, all of which is well known in the art at the present time.

Within the standard 10 is mounted a horizontal shaft 21 driven by a pulley 22 which shaft through speed gears 23 imparts rotation to a horizontal shaft 24 above and parallel with the shaft 21. Rotatable freely on the shaft 24 at the center of the base are two bevel pinions 25 and 26 which, however, are held against longitudinal movement on the shaft. These pinions face each other a short distance apart and both mesh with a bevel gear 27 above the shaft 24 fixed on the vertical shaft 28 extending upwardly through the turn table 11 and the bottom of the head 12 in the axis of the turn table. Slidably mounted on the shaft 24 but rotatable therewith is a clutch member 29 which, when moved in one direction connects the clutch 29 with a clutch on the bevel pinion 25 to turn the shaft 28 in one direction while the movement of the clutch member in the opposite direction couples the pinion 26 to the shaft and imparts to the shaft 28 a reverse movement. Movement along the shaft 24 is imparted to the clutch member 29 by means of a horizontal rock shaft 30 journaled transversely in the base 10 near the top and having on its inner end an arm 31 from which projects a pin into a peripheral groove in the clutch member. The outer end of the rock shaft carries an upstanding hand lever 32 that swings over a lock plate 33 and is adapted to be secured thereto in either of two positions to secure proper engagement of the clutch member with one or the other beveled pinions 25 and 26.

Within the head 12 is formed a cavity 34 through which passes in a vertical direction the shaft 28, the upper end of said shaft being journaled in the top of the cavity as shown. Within the cavity at the upper end of the shaft is a beveled gear 35 mounted to turn freely on the shaft but held against longitudinal movement. A similar gear 36 is carried by the shaft 28 at the bottom of the cavity. These two bevel gears may be alternately connected as desired with the shaft for rotation therewith by means of a clutch member 37 slidable on the shaft between the bevel gears but mounted to rotate with the shaft. This clutch member is similar to the clutch member 29 and operated in like manner by a rock shaft 38, journaled in the head 12 and having on its opposite ends an operating arm 39 and a hand lever 40.

In engagement with the upper bevel gear 35 is a bevel gear 41 keyed on a horizontal shaft 42 mounted in bearings in the head 12 and extending into the vertical tool head 13, the outer end of the shaft 42 carrying a miter gear 41$^a$ that meshes with a like gear 41$^b$ mounted to turn in a horizontal bracket 43 projecting from the head 12. The tool head 13 is carried by slides 44 in the head 12 and is movable vertically in said slides by a pinion 45 on a horizontal shaft 46 journaled in the head 12 and provided on one end without the head with a hand lever or wheel 47. The pinion 45 meshes with a rack on the inner side of the tool head 13 so that upon rotating the shaft 46, the vertical tool head will be raised or lowered. Journaled within the tool head 13 is a tubular tool spindle 48 that passes freely through the miter gear 41$^b$ as the head 13 is raised and lowered but which is keyed to turn with the miter gear 41$^b$.

A horizontal tool spindle 49 is journaled in the rotating head 12 at the opposite side or end from the vertical tool spindle 48 and has fixed on its inner end a bevel gear 50 in engagement with the lower bevel gear 36 on the vertical shaft 28. The outer end of the horizontal tool spindle 49 carries a chuck 51 for gripping the mandrel of the cutting tool, the opposite end of the mandrel being carried when desired in a bracket 52 projecting downwardly from a horizontal bar 53 adjustably mounted in a long bearing 54 at the top of the rotatable head 12.

It is not thought necessary to enter further into the details of construction of the vertical and horizontal tool heads, knee 15, work table 18 and speed gears and various other parts as they are of standard construction and well understood by those skilled in the art. With such description as has been given, it is believed the operation of the device will be clear from the following description.

Rotation being imparted to shaft 21 through the pulley 22 the correct speed for the work to be performed is imparted to the shaft 24 by adjusting the speed gears 23. The shaft 24 rotates the clutch member 29 which may be coupled to either of the bevel pinions 25 or 26 as may be necessary to impart rotation to the shaft 28 in one direction or the other as the work to be performed requires. If the vertical head 13 is to be used the rotatable head 12 will be turned if it be in any other position than that shown in Fig. 2 until said head stands above the work table 18. When in proper alinement therewith the head will be clamped to the turn table by well known means and which has not been illustrated in detail, as such features do not form a part of the present invention. In this position of the rotatable head 12, the rock shaft 38 will be moved to the right to raise clutch member 37 into engagement with bevel gear 35 and that through its engagement with the bevel gear 41, the shaft 42 will be rotated and by means of miter gears 41$^a$ and 41$^b$ the tool spindle 48 and the tool carried by the chuck 51 on the lower end of the spindle rotated for cutting work secured to the work table 18.

If horizontal cutting by the milling machine be desired, the rotatable head will be loosened and its position changed until the tool head 14 is above the work table 18, after which the parts will be clamped. Angular adjustment of the head with respect to the work table is made through the scale 55 on the edge of the bottom plate 56 of the head 12 as shown in Fig. 4. The clutch member 37 will then be shifted to connect the bevel gear 36 with the shaft 28 so that rotation will be conveyed to the horizontal tool spindle 49.

A machine constructed as described will be economical and will save a great amount of time by doing away with the necessity for resetting the piece of work from a horizontal machine to a vertical machine. Work when once secured to the table 18 will be ready for either the vertical head or the horizontal head and the only requirement being a rotation of the head 12. Floor space is also saved in a shop as this machine is capable of performing the operation of two machines and occupies the floor space of one machine only. Another advantage is that this machine will cost much less than a vertical machine and a horizontal machine and will perform the operation of both.

What I claim is:

The combination in a milling machine, of a hollow base, a vertically adjustable work table on one side of said base, a head rotatably mounted on the top of said base having tool carrying heads on the opposite ends thereof, two independent gear trains in said rotating head for driving the tool holders carried by the respective heads, a vertical shaft extending through the base and into the rotatable head in its axis of rotation for positively driving either of said gear trains in any position of the rotatable head, means for optionally connecting one or the other of said gear trains to the vertical shaft, a driving shaft journaled within said base, changeable speed driving gearing also within the base between said driving shaft and said vertical shaft, and means forming a part of the driving gearing for reversing the direction of rotation of the vertical shaft.

In testimony whereof I affix my signature in presence of two witnesses.

ALEXANDER E. METZ.

Witnesses:
 ALFRED F. KENNARD,
 DELOS CECAEV.